United States Patent [19]

Schultz

[11] 4,338,278
[45] Jul. 6, 1982

[54] METHOD FOR MAKING A COLLAPSIBLE DISPENSING TUBE HAVING AN ANCHORED BARRIER MEMBER

[76] Inventor: Robert S. Schultz, 7 Heusted Dr., Old Greenwich, Conn. 06870

[21] Appl. No.: 113,608

[22] Filed: Jan. 21, 1980

Related U.S. Application Data

[62] Division of Ser. No. 814,323, Jul. 8, 1977, Pat. No. 4,185,757.

[51] Int. Cl.³ .................. B29D 3/00; B29D 23/08; B29F 1/00
[52] U.S. Cl. .................. 264/261; 264/263; 264/267; 264/273; 264/274; 264/DIG. 41
[58] Field of Search .......... 264/DIG. 41, 259, 328.1, 264/267, 241, 320, 273, 274, 263, 261; 29/527.1, 527.2, 527.3; 220/15; 222/105–107; 425/112

[56] References Cited

U.S. PATENT DOCUMENTS

| | | | |
|---|---|---|---|
| 1,921,021 | 8/1933 | Bungay | 222/107 |
| 2,958,898 | 11/1960 | Voumard et al. | 264/DIG. 41 |
| 2,970,723 | 2/1961 | Flax | 222/107 |
| 3,124,282 | 3/1964 | Winstead | 222/107 |
| 3,791,557 | 2/1974 | Venus | 222/105 |
| 3,988,413 | 10/1976 | Gaudet et al. | 264/DIG. 41 |
| 4,021,524 | 3/1977 | Grimsley | 264/DIG. 41 |
| 4,032,611 | 6/1977 | Fukuoka | 264/273 |
| 4,038,359 | 7/1977 | Pendleton | 264/273 |
| 4,132,331 | 1/1979 | Mägerle | 222/107 |

*Primary Examiner*—Willard E. Hoag
*Attorney, Agent, or Firm*—Alfred E. Miller

[57] ABSTRACT

Method for making a collapsible dispensing tube in which plastic fabricating materials other than conventional materials can be selected which are more suitable, since the pressure in the process is increased while the temperature is decreased. This manufacturing method utilizes a locking taper resulting in a better bond between the headpiece, barrier member, and the inner wall of the collapsible tube and substantially eliminating blowby of plastic material into said collapsible tube. The barrier member extends to and is tightly engaged with the adjacent inner wall of the collapsible tube and substantially eliminates bypass of gases around the barrier member. The method of manufacture permits the selection of the most suitable thermoplastic material for the intended use from a group of materials.

7 Claims, 9 Drawing Figures

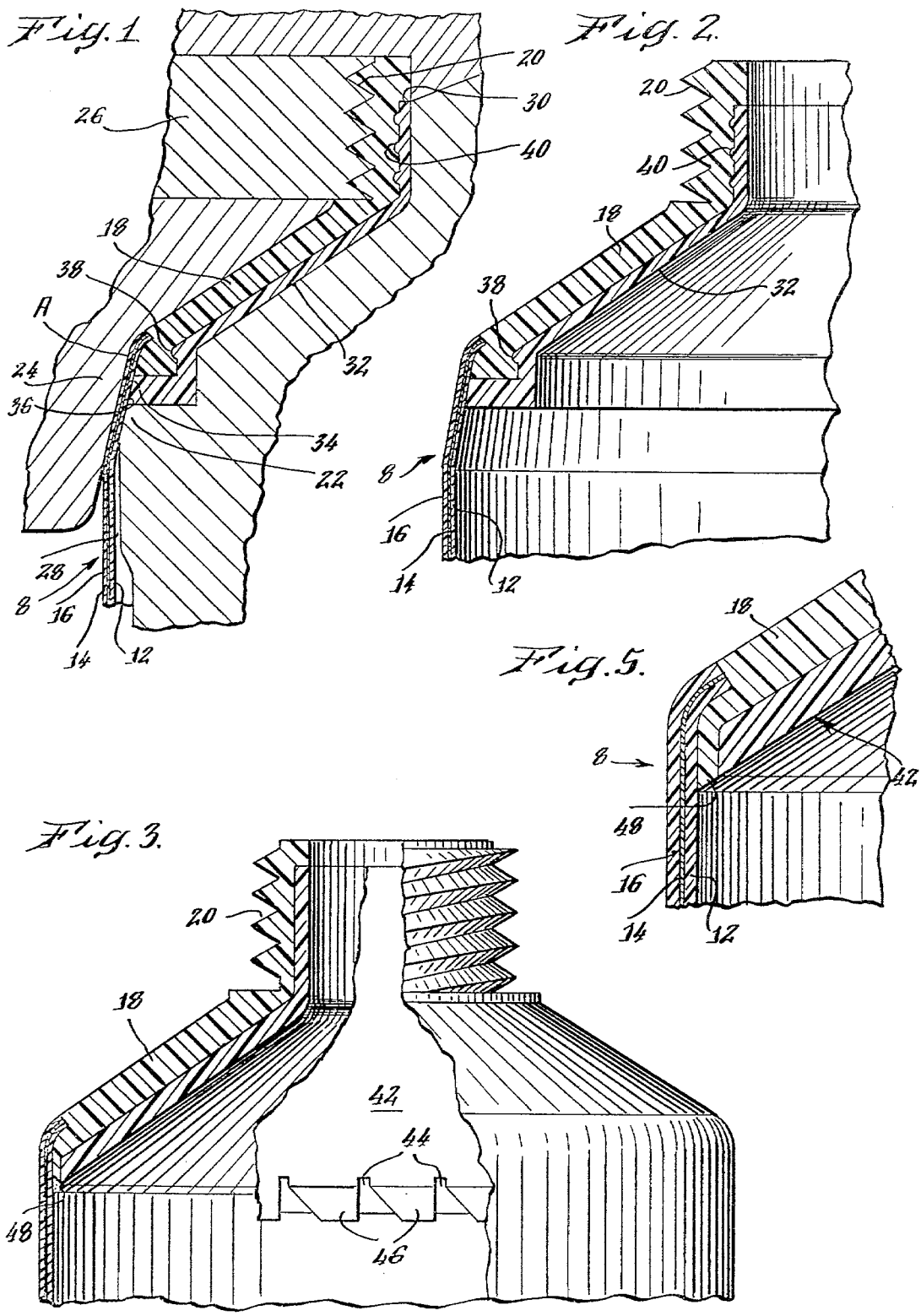

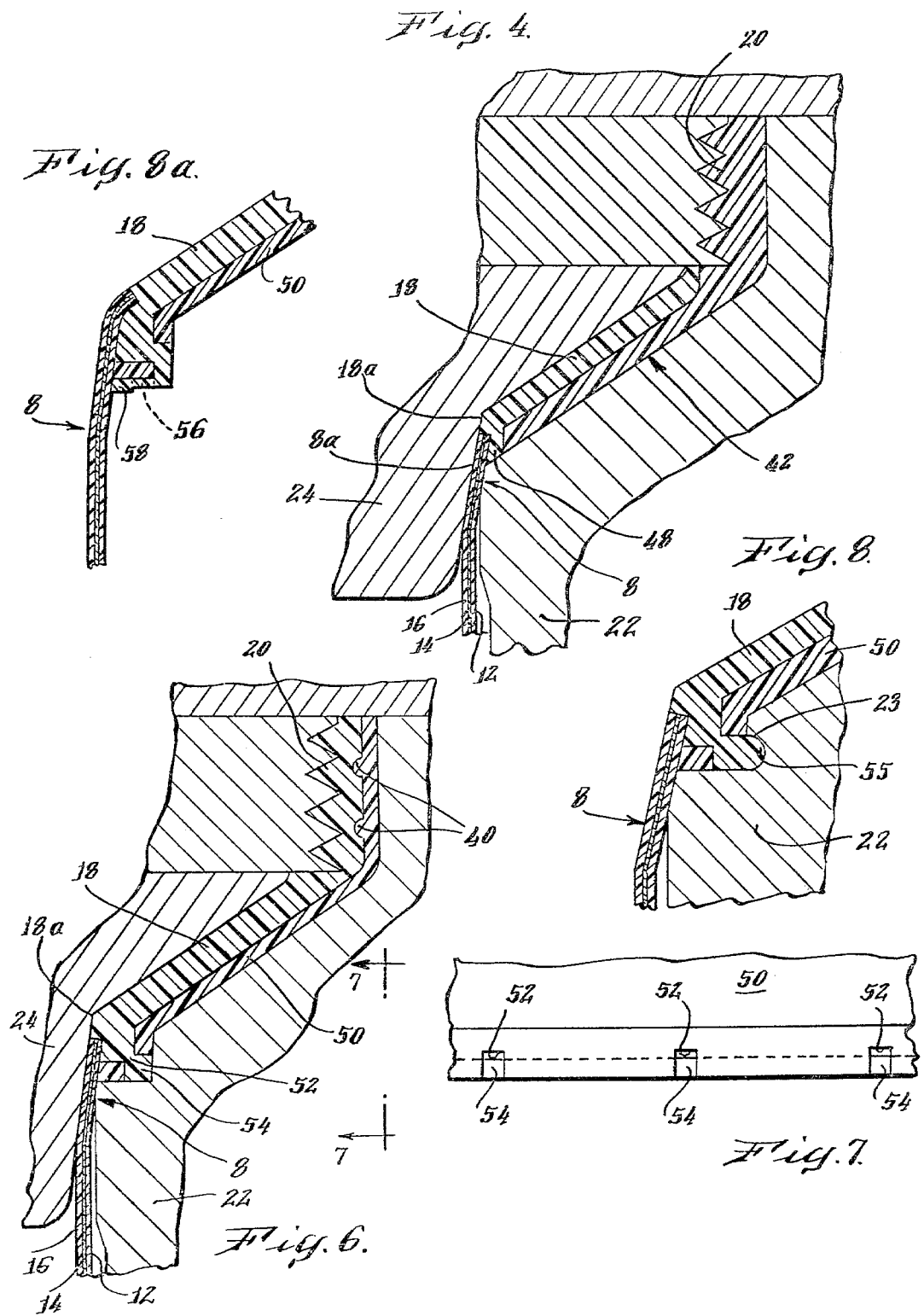

METHOD FOR MAKING A COLLAPSIBLE DISPENSING TUBE HAVING AN ANCHORED BARRIER MEMBER

This is a division of application Ser. No. 814,323, filed July 8, 1977 and now U.S. Pat. No. 4,185,757.

BACKGROUND OF THE INVENTION

The manufacture and fabrication of tubular articles of thermoplastic materials such as collapsible tubes are known and U.S. Pat. No. 2,673,374 to Strahm discloses a method of manufacturing a tubular product in which a thin-walled plastic tube is formed and a shoulder and screw-threaded cylindrical part affixed thereto by injection molding thereby forming a tubular plastic article with a headpiece. An improvement to the Strahm patent was U.S. Pat. No. 3,172,571 to Marchak in which a tubular body for a collapsible tube is formed of a laminated construction having an intermediate layer that is impervious to the contents of the tube while recognizing that some loss of moisture or product contents of the tube could take place through the plastic head. Marchak further stated that losses were held to a minimum because of the relatively thick plastic head. In U.S. Pat. No. 3,565,293 applicant had constructed a collapsible dispensing container with a deformable body of low permeability and laminated construction, a thermoplastic headpiece, and an insert disc in the form of a barrier member that substantially eliminates product losses and which is spaced from the inner wall of the collapsible tube. The headpiece is provided with an annular lip underlying the peripheral edge of the barrier member.

The present invention relates to a collapsible tube of the dispensing type and a method of making the same wherein higher pressures are built up thereby resulting in a reduced temperature and a faster fabricating cycle.

It is an object of the present invention to provide a tube and headpiece construction for a collapsible tube in which a better bond is achieved.

Another object of the present invention is to provide a collapsible tube construction which substantially eliminates blowby of the plastic materials utilized in the manufacture thereof.

It is an object of the present invention to have the ability to use low density polyethylene for the material or other suitable materials of the headpiece tube because of the ability to use higher pressures and thereby lower temperatures.

It is a further object of the present invention to provide a barrier member insert for the headpiece which extends to and tightly abuts the adjacent inner wall of the collapsible tube.

In order that the invention will be more clearly understood, it will now be disclosed in greater detail with reference to the accompanying drawings, in which:

FIG. 1 is a sectional view of a collapsible tube showing the headpiece and barrier member being formed by a die and mandrel in accordance with the teaching of the method of the invention;

FIG. 2 is a sectional view of the completed collapsible tube combination as fabricated in FIG. 1;

FIG. 3 is a partial elevational and a partial sectional view of another embodiment of the present invention;

FIG. 4 is another embodiment of the present invention illustrating a method of manufacture of a collapsible tube having squared shoulders;

FIG. 5 is a fragmentary enlarged section of FIG. 3 showing the laminated collapsible tube structure;

FIG. 6 is a partial sectional view of a further modification of the present invention;

FIG. 7 is a partial elevational view of the embodiment shown in FIG. 6, taken along the lines 7—7 of FIG. 6;

FIG. 8 is a partial sectional view, similar to FIG. 6, however showing an alternate embodiment of the present invention; and FIG. 8a is a further partial sectional view of another embodiment of the present invention.

DESCRIPTION OF THE PREFERRED EMBODIMENT

A collapsible tube is shown in FIG. 1 of the type such as is used for the dispensing of toothpaste and which is referred to generally by the reference numeral 8. The tubular body has a three-ply laminated construction having inner and outer thermoplastic layers 12 and 16 and intermediate layer 14 constituting, for example, metal foil. The headpiece 18 for the tubular body comprises an easily moldable thermoplastic material such as low density polyethylene and includes a threaded neck portion 20 which is adaptable to receive a screw cap (not shown).

Referring to FIG. 1, the method of manufacturing the present collapsible tube is shown in which a thermoplastic collapsible laminated tube with a foil intermediate layer, and outer and inner layers of low density polyethylene is slid over a tapered mandrel 22 and the entire assembly pushed into a tapered die 24. Thread plates 26 move laterally to engage the neck portion 20 to form threads thereon. Thus, the tube 8 initially fits loosely on the mandrel 22 and as the tapered die 24 moves down the axis the top of the tube is bent about 10°, however, it is within the scope of the present invention to bend the top of tube 8 to any selected angle between 5° to 20°. Furthermore, a space 28 is formed between the mandrel 22 and the adjacent inner surface of the tube 8. A molding gate 30 is located at the top of the assembly which permits the injection molding of plastic material therein forming a headpiece 18 locking in barrier member 32. The barrier member 32 is provided with an angular, annular peripheral edge surface 34 that engages a correspondingly angled inner wall 36 of the tubular body 8. The locking taper formed by the aforesaid angled surfaces at A is clearly shown which permits the building up of high pressures in the manufacturing process with the desirable result of obtaining a faster process cycle as well as a better bond between the headpiece, barrier insert and tubular body. Moreover, the locking taper configuration provides another clearly desirable result in that blowby of the thermoplastic material is virtually eliminated upon the injection of the plastic material. In order to ensure the reliable anchoring of the barrier member 32 to headpiece 18, the barrier member is provided with a lower bead 38 and upper beads 40. In this regard, it should be pointed out that the lower bead 38, although it assists in anchoring the barrier member, is not essential to achieve the desired result.

It should be apparent that there is a choice of desirable fabricating material since the temperature required for the process can be varied thereby permitting a faster cycle. For example, a lower heat may be employed so that low density polyethylene can be used in the manufacturing process. It should also be evident that the present method may be used with or without the use of an insert or barrier member 32. It should be pointed out that known collapsible laminated dispensing tubes must use a higher melting high density thermoplastic material since the intermediate metallic layer, such as aluminum acts as a heat sink, and therefore more heat must be supplied in order to achieve a bonding of the parts of the collapsible tube. On the other hand, the present invention allows more pressure to be applied, which achieves a better heat transfer and consequently a better adhesion between the assembled parts of the collapsible dispensing tube, and also allows the use of lower density polyethylene which softens at a lower temperature.

It is evident from a study of FIG. 1 of the drawings that the novel process resulting in the bending inwardly of the top of tube 8 at A, together with a corresponding bevelled surface 34 of the barrier member 32, as well as the concomitant increase in pressure and the ability to lower the temperature, results in an exceptionally good bond of the tube, the thermoplastic headpiece and the barrier insert. Furthermore, the heat insulating characteristics of the present structure enhances the welding process. Moreover, the fact that the peripheral annular edge surface 34 of the barrier insert engages an inner surface of the tube 10 along its entire circumference prevents the flow of thermoplastic material against the tooling during the injection molding steps. This condition results in an insulating effect whereby the heat generated will be shunted to the laminated tube structure thereby permitting lower temperatures.

Since the barrier member 32 has its free edge circumferentially engaging the inner wall of tube 10, there is no cantilever effect on that member as was the case in U.S. Pat. No. 3,565,293. Thus, in the prior art construction it was necessary to have a barrier member that was thick and stiff enough to withstand the forces generated by both high temperatures and pressure. Consequently, in accordance with the teachings of the present invention, a relatively thin, flexible barrier member could be used in place of the conventional rigid insert presently being employed. This relatively thin barrier member will function to prevent bypass of gases around its peripheral edge since it is either in substantial engagement, or full engagement, with the adjacent inner wall of the tube 8.

Referring to FIGS. 3 and 5, an alternate embodiment of the present invention is shown having a barrier insert member referred to generally by the numeral 42 that is castellated on its peripheral edge to form alternate projecting sections 46 and recessed sections 44. The projecting sections 46 abut the adjacent interior wall of the collapsible tube 8 while the recessed sections 44, as seen in FIGS. 3 and 5, receive a flow of thermoplastic material 48 that assists in anchoring the barrier insert member 42 to the headpiece 18 as well as to tube 8. It will be noted that the thermoplastic material 48 is located between the barrier insert member and an inner surface of the tube wall which is spaced therefrom at spaced locations about the circumference of the barrier insert member, but with substantial engagement by the peripheral surfaces of the projecting portions of the barrier insert member along the adjacent inner wall of tube 8. A tapered die and a tapered mandrel, such as shown in FIG. 1 and described hereinbefore, is employed in the present arrangement. FIG. 4 shows the method of bending the top of tube 8 and forming a square shoulder tube 18a. The barrier insert member 42 is in a castellated form having spaced projections that engage a substantial portion of the inner wall of the tube 8, similar to the construction shown in FIG. 3 and having thermoplastic material 48 that flows into the spaces between the projections. It will be observed from FIG. 4 that the top edge 8a of the tube 8 is relatively straight and does not curl inwardly. This construction is possible since there is sufficient strong squeeze of the laminates 12, 14 and 16 between the tapered die 24 and tapered mandrel 22 to allow high injection pressure without forcing the laminates downwardly. Therefore, this arrangement permits the conical-shaped top of the tube to be squared off, hence presenting a difference appearance of the tube, which conventionally has rounded shoulders, as seen in FIG. 3.

FIGS. 6 and 7 show a further embodiment of the present invention in which the barrier insert member 50 is provided with spaced holes 52 that are cut into the member 50 so that the thermoplastic material 54, upon injection molding, flows through the barrier holes 52 and functions to anchor the barrier insert member 50 to the headpiece 18 as well as the tube 8.

FIG. 8 is another alternative embodiment of the present invention and is similar to the construction illustrated in FIG. 6, however the mandrel 22 has a groove 23 which permits the inward flow of thermoplastic material forming the headpiece 18 through the holes 52 to create an annular ring 55 below the barrier insert member 50. This arrangement functions to further strengthen the anchor of member 50 to the headpiece 18 and collapsible tube 8.

FIG. 8a is a further embodiment of the present invention which is similar to the construction shown in FIG. 8, however disclosing spaced grooves 56 that permit the flow of thermoplastic material from the headpiece 18 into an annular ring 58. The latter construction results in a reliable securement for the member 50.

A desirable result of the construction and method of manufacture, as set forth herein, is the production of a collapsible dispensing tube of the laminated type in which a material may be selected from a choice of fabricating materials especially for the specific use intended.

What is claimed:

1. A method of making a collapsible container having a flexible tubular body and provided with a thermoplastic headpiece comprising: inserting a flexible tube over a tapered mandrel having a conical taper of a certain angle, moving a die having an angled portion corresponding to said taper of said mandrel against said tube to thereby push the same into engagement with the conical taper of said mandrel whereby said top of said tube is bent inwardly and a portion of said tube immediately below said top is further bent into a conical shape having an angle substantially corresponding to the angle of the conical taper of said mandrel, said top portion and top edge of said tube being spaced from said mandrel and therefore not engaged thereby, moving thread plates in a direction toward said tube to engage the neck portion thereof and form threads therein, and forcing a thermoplastic material through a molding gate located in the top area of said assembly to injection mold said headpiece between the mandrel and die to thereby secure said headpiece to said tubular body whereby said thermoplastic material flows into said space between the inner wall of said top portion and the adjacent surfaces of said mandrel to firmly adhere the top wall of said tubular body to said headpiece.

2. The method as claimed in claim 1 wherein said tubular body is a laminate.

3. The method as claimed in claim 1 further comprising inserting a barrier member between said mandrel and die, said barrier member having at least part of its extreme peripheral edge engaging the adjacent inner wall of said tubular body.

4. The method as claimed in claim 3 wherein the part of said peripheral edge engaging the adjacent inner wall of said tubular body is bevelled at an angle which corresponds with the angle of bend of said top of the tube.

5. A method of making a collapsible container as claimed in claim 3 further providing said barrier member with spaced openings at the lower portion thereof, said tapered mandrel having an annular groove adjacent to said spaced openings whereby when said headpiece is injection molded thermoplastic material flows through said spaced openings in the barrier member and into a space formed by said groove in the mandrel to form an internal annular ring on said headpiece.

6. A method of making a collapsible container as claimed in claim 3 further providing said barrier member with spaced openings at the lower portion thereof, and flowing thermoplastic material through spaced channels connected to said openings and under a part of said barrier member to a chamber located under said extreme peripheral edge of the barrier member to form an annular ring that is integral with said headpiece.

7. A method of making a collapsible container having a flexible tubular body and provided with a thermoplastic headpiece comprising: inserting a flexible tube over a tapered mandrel having a conical taper of a certain angle, moving a die having an angled portion corresponding to said taper of said mandrel against said tube to thereby push the same into engagement with the conical taper of said mandrel whereby said top portion of said tube is bent inwardly, said top portion and top edge of said tube being spaced from said mandrel and therefore not engaged thereby, moving thread plates in a direction toward said tube to engage the neck portion thereof and form threads therein, and forcing a thermoplastic material through a molding gate located in the top area of said assembly to injection mold said headpiece between the mandrel and die to thereby secure said heapiece to said tubular body whereby said thermoplastic material flows into said space between the inner wall of said top portion and the adjacent surfaces of said mandrel to firmly adhere the top wall of said tubular body to said headpiece.

* * * * *